United States Patent [19]

Valencia

[11] Patent Number: 4,716,837
[45] Date of Patent: Jan. 5, 1988

[54] AUTOMOBILE TURNTABLE

[76] Inventor: Alfred E. Valencia, 2635 S. 10th Ave., Arcadia, Calif. 91006

[21] Appl. No.: 910,235

[22] Filed: Sep. 19, 1986

[51] Int. Cl.$^4$ ............................................. B60S 13/02
[52] U.S. Cl. ................................................ 104/38; 104/41
[58] Field of Search ................... 105/44, 28; 104/35, 104/36, 37, 45, 245, 38, 39, 40, 41, 42, 43, 46, 47; 248/349

[56] References Cited

U.S. PATENT DOCUMENTS

| | | | |
|---|---|---|---|
| 1,006,172 | 10/1911 | Adams | 104/43 |
| 1,969,634 | 8/1934 | Acuff | 104/41 |
| 4,172,422 | 10/1979 | McBride | 104/38 X |
| 4,608,929 | 9/1986 | Park | 104/38 X |

Primary Examiner—Robert B. Reeves
Assistant Examiner—Thomas W. Kearns
Attorney, Agent, or Firm—Roger A. Marrs

[57] ABSTRACT

A turntable for positioning a parked vehicle is disclosed herein having a revolving platform operably mounted on a portable base with driving mechanism interconnecting the base with the platform. Rollers movably support the platform on the base in combination with reinforced tracks. Wheel stops are incorporated into the top surface of the platform for releasably retaining the vehicle in a parked position during operation of the turntable and remote controls as well as manual controls are employed for starting and stopping the operation.

5 Claims, 3 Drawing Figures

U.S. Patent   Jan. 5, 1988   4,716,837
FIG. 1.
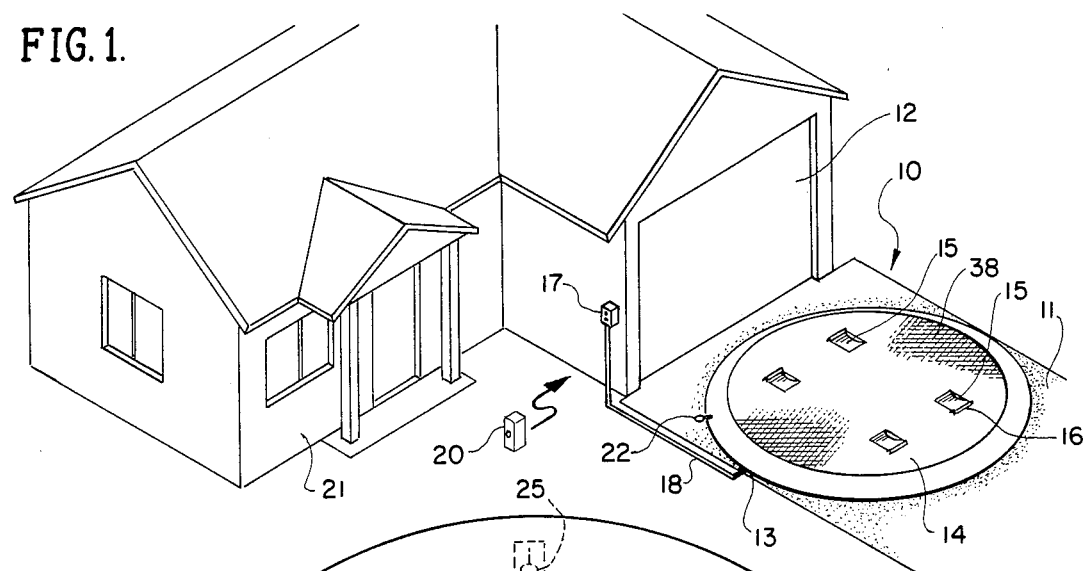
FIG. 2.
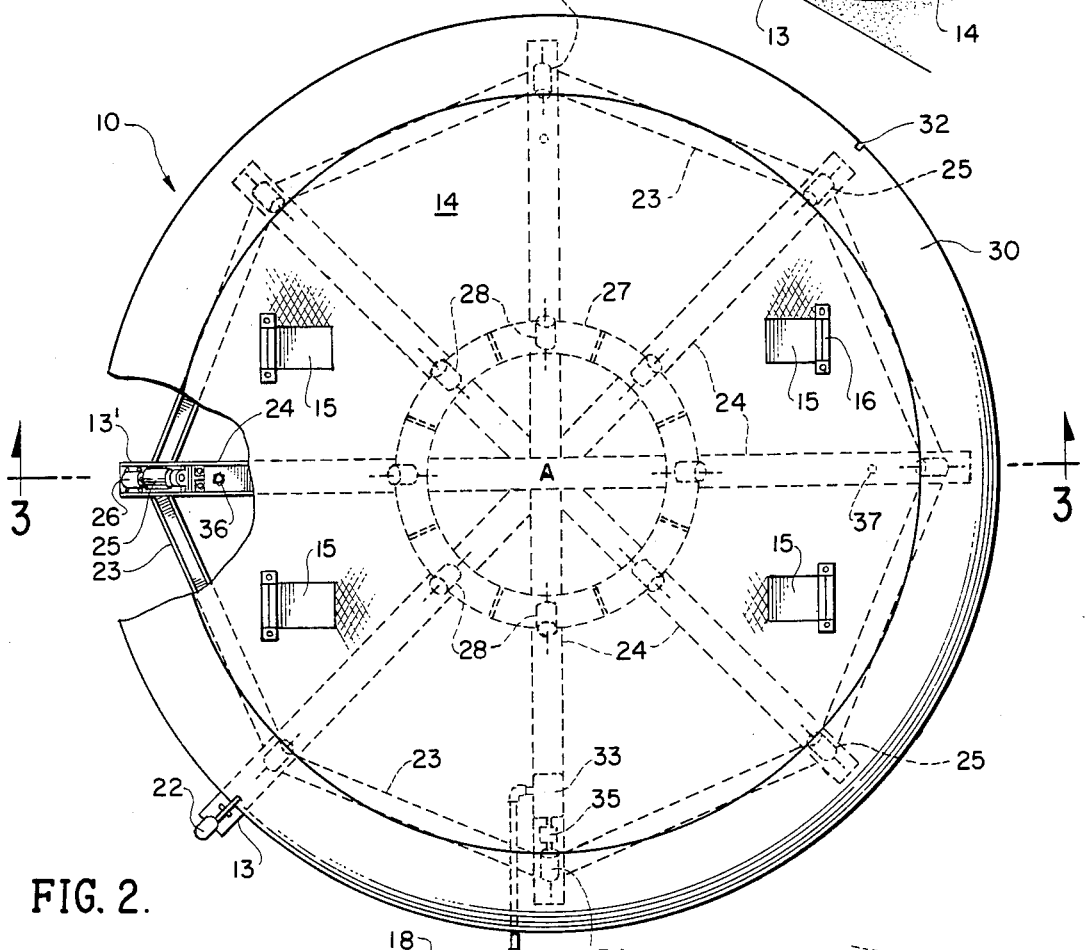
FIG. 3.

AUTOMOBILE TURNTABLE

BACKGROUND OF THE INVENTION

1. Field of the Invention

The present invention relates to vehicle turntables and, more particularly, to a novel portable turntable adapted to be placed on the surface of a driveway ahead of the garage and which may be locally or remotely operated to revolve the turntable.

2. Brief Description of the Prior Art

In the past, it is well known in congested and crowded urban areas that driveways are usually made relatively narrow and do not provide sufficient room for a vehicle to make an unbroken U-turn so that the vehicle may be turned and allowed to drive in a forwardly direction between the garage at one end of the driveway and the exit to the street at the oppposite end of the driveway. Also, it is well known that conventional backing into a street from a garage driveway is hazardous since the driver's view is greatly obstructed.

Although prior attempts have been made to provide a variety of turntables which permit the repositioning of a vehicle on a driveway, these prior turntables require extensive installation in the driveway itself and do not represent a portable situation. Therefore, a major installation is required which is not only complex but expensive. Also, such prior attempts permit localized operation of the turntable but do not envision remote operation from either within the house adjacent to the driveway or from a remote unit carried on the vehicle itself.

Accordingly, a long-standing need has existed to provide a means whereby the vehicle may be forwardly driven from the street along the driveway into a garage at the end of the driveway and wherein after the car is removed from the garage it can be rotated around so as to drive outwardly into the street in a forward direction without the need of performing a backing procedure. Such a means is intended to be portable so that permanent installation is unnecessary and it is intended that local as well as remote operation of the turntable be provided.

SUMMARY OF THE INVENTION

Accordingly, the above problems and difficulties are obviated by the present invention which provides a novel turntable apparatus comprising a base adapted to rest on a supporting structure without permanent installation. A turntable is rotatably carried on the base by means of a plurality of rollers arranged in a circular path bearing against a circular track. Drive means are provided which are operably connected to the turntable and control means are coupled to the drive means so that local operation is possible at the turntable site or remote operation can be achieved from either the adjacent house or from the interior of the vehicle.

Therefore, it is among the primary objects of the present invention to provide a novel turntable means for accommodating a vehicle which is adapted to be portably placed on the driveway surface without major installation so as to permit the vehicle to be rotated into an opposite direction without the necessity of maneuvering a U-turn.

Another object of the present invention is to provide a novel vehicle turntable for use in a driveway which is relatively inexpensive to manufacture and install and that may be readily moved from place to place without major disassembly or substantial installation.

Still a further object of the present invention is to provide a novel turntable mechanism which may be locally or remotely operated and which includes a simplified mounting means for pivotally mounting a turntable to a base portion so that smooth and uninterrupted rotation of the turntable can be provided.

Yet another object of the present invention is to provide a means for releasably indexing and retaining the vehicle in a strategic position on the turntable so that the vehicle will not roll or become dislodged from the position during the operation of the apparatus.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view showing the novel turntable apparatus of the present invention installed in a typical driveway situation;

FIG. 2 is an enlarged top plan view of the turntable apparatus having a portion broken away to illustrate a portion of the roller support means; and FIG. 3 is a transverse cross sectional view of the turntable apparatus shown in FIG. 2 as taken in the general direction of arrow 3—3 thereof.

DESCRIPTION OF THE PREFERRED EMBODIMENT

Referring to FIG. 1, a typical installation of the novel turntable apparatus of the present invention is illustrated in the general direction of arrow 10 wherein the apparatus is illustrated as resting on top of a conventional driveway 11 which leads from a street (not shown) to the front of a garage 12. The apparatus comprises, in general, a base 13 which rests on top of the pavement of the driveway 11 and the base mounts a revolving platform 14. The top surface of the platform is provided with a plurality of spaced apart depressions, such as depression 15 and a plurality of bumps such as bump 16. The depressions are arranged in a manner so as to mate with the general overall configuration or arrangement of tires on a vehicle. Therefore, when the vehicle approaches the turntable 14, the tires are indexed by mating with the depressions 15 and the vehicle is retained in position when all four tires of the vehicle rest in the respective depressions. The bumps 16, associated with each of the depressions, alerts the driver of the vehicle that a depression is under a particular wheel during the parking procedure.

It is to be particularly noted that the turntable apparatus 10 is above the surface of the driveway 11 and that the base 13 merely rests on the surface and is not subterraneal nor buried in any manner. Operation of the turntable is achieved by means of a control system contained within the box 17 connected to the base of the turntable apparatus by means of a conduit 18. Therefore, by merely pressing selected buttons on the control box, starting and stopping of the revolving turntable can be achieved. Furthermore, remote operation of the turntable may be achieved by means of a transmitter unit 20 which may be either carried in the vehicle or in the house 21 of the user. Therefore, both remote and local operation of the turntable is available to the user. A releasable lock or retainer is included in the base 13 and is provided with a treadle 22 so that the operator may lock or release the turntable from a locking position as desired. When the treadle is depressed, the turntable 14 is releasably held to the base 13 and the turntable will not revolve.

Referring now in detail to FIG. 2, the platform 14 is illustrated having a portion broken away to expose the base 13' thereunder. The base 13 includes a plurality of braces such as brace 23 which are arranged to interconnect a plurality of crossbeams such as crossbeam 24. The plurality of crossbeams appear to outwardly radiate from a center identified by character A which serves as a center about which the turntable 14 will rotate. The plurality of braces 23 are arranged substantially near the terminating outer ends of the cross members and the ends of the cross members mount a roller 25 on a pillow block 26. This arrangement is carried out at the intersections of the ends of the braces with each of the respective ends of the cross members. An inner conical disk or ring 27 is provided that is coaxially disposed with respect to the turntable 14 and the arrangement of braces 23. The inner conical disk includes a plurality of rollers, such as roller 28, that are arranged in fixed spaced apart relationship on each of the respective cross members in fairly close proximity to the center character A. Therefore, it can be seen that a pair of supporting roller ring-like arrangements are provided wherein an outer ring of rollers 25 will support the outer edge marginal region of the turntable 14 while the inner arrangement of rollers in a circle will support the inner section of the turntable 14 inward.

As shown more clearly in FIG. 3, the outer rollers 25 are angularly disposed and rest against the angled downward sloping surface of a skirt 30 carried on the outer peripheral marginal region of the turntable 14. The inner rollers 28 are also angularly disposed and ride against a circular track 31 that may be referred to as an inner track that downwardly depends from the underside of the turntable 14. Therefore, the underside of sloping skirt 30 provides an outer track which is coaxially disposed with respect to an inner track composed of the circular angled member 31. The turntable 14 is supported on the base of cross members and braces in a manner so as to revolve about the character A by means of the roller and track arrangement comprising the inner and outer roller/tracks. Releasably holding the turntable in position with respect to the base is achieved by the foot treadle 22 which is spring-loaded and includes a latch intended to insertably engage with a notch 32 provided in the peripheral edge of the skirt 30 as shown in FIG. 2.

FIG. 2 also discloses a drive means comprising a motor 33 bolted to a cross member channel and operably coupled to a drive roller 34 via a flexible coupler 35. The motor is connected to the control box 17 via the conduit 18 and the turntable is moved by means of the direct drive of drive roller 34 with the underside of the sloping skirt 30.

As further illustrated in FIG. 3, the base 13 may be anchored to the underlying driveway 11 by anchor bolts such as indicated by numerals 36 and 37 respectively. The bolts are merely driven into the paved surface of the driveway for retention purposes. The anchoring will maintain the entire assemblage in a fixed position. It is also to be noted in FIG. 3 that the sloping skirt 30 raises the platform 14 above the surface of the driveway 11 and that the extreme peripheral edge of the skirt clears the driveway 11 so that rotation is not impeded. Therefore, the undercarriage or base 13 including the cross members, braces and inner circular construction 27 are fixedly mounted to the driveway 11 while the turntable 14 is free to revolve about the center identified by character A.

In actual operation, the driver of the vehicle drives the vehicle on driveway 11 and accelerates slightly up the sloping skirt 30 so that the vehicle can be aligned with the depressions 15 and register therewith. When properly aligned and registered, the vehicle's forward motion is stopped and the driver can leave the vehicle. Preferably, the uppermost surface of the turntable is roughened as indicated by numeral 38 in FIG. 1 so that adequate traction is provided. Once the vehicle has been registered, the operator may subsequently revolve turntable 14 by actuating the control box 17 or by using the remote unit 20. Such revolution will turn the vehicle around so that it may proceed along the driveway in a forward movement and backing the vehicle is completely eliminated. The drive motor 33 operates the turntable in a given direction when released by the foot treadle 22 via the plurality of rollers and primarily the drive roller 34. An important object is to understand that the device is portable and simply may be lifted in two parts, namely, the turntable 14 and base 13, and transported to another location where it can be readily set up by inexperienced persons without special tools. Therefore, the driveway 11 is not damaged or modified and the only retaining attachment is by means of the anchor bolts 36 and 37.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a portable vehicle turntable apparatus, the combination of a circular platform having an upper surface characterized as roughened surface elevated above a pavement surface of a driveway;

said platform further having a downward sloping surface carried on a circular skirt carried about the periphery of said platform wherein said sloping surface interfaces said pavement surface of said driveway with said elevated roughened surface of said platform so that a vehicle may travel therebetween;

a base means removably located on a selected portion of said driveway pavement for rotatably supporting said platform whereby said vehicle positioned thereon may be turned about into an opposite direction;

said platform have an undersurface with a pair of coaxial, spaced apart angular tracks wherein the angular disposition of said angular tracks are substantially opposite with respect to each other;

elongated rollers operably carried on said base means in a pair of circular paths immediately under and in registry with said pair of spaced apart tracks whereby said platform is movably supported on said rollers for revolving about said base means above and elevated from said driveway pavement surface;

drive means mounted on said base means operably coupled to a selected one of said rollers for imparting a driving force to said selected roller to move said platform on the remaining ones of said rollers; and combined local and remote control means for selectively operating said drive means whereby control may be effected from said vehicle, at the turntable site or from within nearby structures.

2. The invention as defined in claim 1 wherein:

said plurality of rollers and said pair of angular tracks rotatably mount said platform on said base means so as to be pivotal about a central location on said base means constituting a central vertical axis.

3. The invention as defined in claim 2 wherein:

the weight of said vehicle and of said platform cooperate to maintain said platform tracks in contact with said plurality of rollers.

4. The invention as defined in claim 3 including:

releasable lock means interconnecting said platform with said base means for releasably maintaining platform in a fixed position on said base means.

5. The invention as defined in claim 4 wherein:

said base means includes a plurality of beam cross members arranged in a radiating configuration so as to have a common central point constituting a central vertical axis about which said platform rotates;

a plurality of brace beams joining at their opposite ends with ends of adjacent cross members; and said rollers being carried on each of said cross members in angular relationship with respect to said central vertical axis.

* * * * *